L. D. SCHOOLFIELD.
KNITTING NEEDLE.
APPLICATION FILED SEPT. 22, 1917.

1,340,255.

Patented May 18, 1920.

INVENTOR
Lucille Willard Schoolfield

UNITED STATES PATENT OFFICE.

LUCILLE DILLARD SCHOOLFIELD, OF DANVILLE, VIRGINIA, ASSIGNOR OF ONE-FOURTH TO WILLIAM L. EDMONSTON, OF WASHINGTON, DISTRICT OF COLUMBIA.

KNITTING-NEEDLE.

1,340,255.   Specification of Letters Patent.   Patented May 18, 1920.

Application filed September 22, 1917. Serial No. 192,669.

*To all whom it may concern:*

Be it known that I, LUCILLE DILLARD SCHOOLFIELD, a citizen of the United States, residing at Danville, in the county of Pittsylvania and State of Virginia, have invented a new and useful Improvement in Knitting-Needles, of which the following is a specification.

My invention relates to improvements in knitting needles to which scales of measurement are applied; and the objects of my improvement are to provide an ever present means for knitters to determine the accuracy of their work; to save the inconvenience of carrying about a tape, or other means of measurement, and the loss of time caused by consulting same, when it is necessary to know the exact number of stitches taken in a fabric.

I attain these objects by the devices illustrated in the accompanying drawing, in which—

Figure 1:
Figure 1 is a horizontal view of a useful form of knitting needle.
Figure 2:
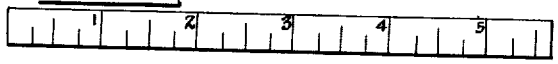
Fig. 2 illustrates a scale which may represent any unit or units of measurement.
Figure 3:
Fig. 3 represents a combination of the needle and scale.
Figure 4:
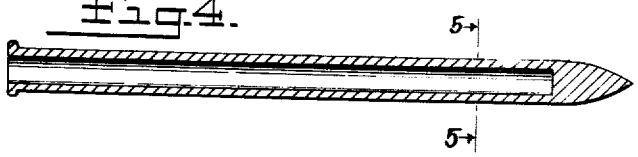
Fig. 4 is a horizontal section of a needle having a hollow core.
Figure 5:
Fig. 5 is an end view of same.
Figure 6:
Fig. 6 is a horizontal view of a scale of measurement.
Figure 7:
Fig. 7 illustrates the combination of Figs. 4 and 6 showing the scale inclosed in the needle-case.

It is obvious that the form of needle used is of no special importance, as it may be long, short, round, triangular, square, etc. Nor is its composition to be deemed material, as it may be made of steel, iron, wood, rubber, celluloid, or any other substance either transparent or opaque. Likewise, the scale may be applied in any suitable manner. It may be engraved, stamped, printed, or painted on the needle, or it may be inserted in the needle (see Fig. 7) in the form of steel, wood, etc.; and it may be secured therein in any suitable manner, either to remain permanently, or to be withdrawn for use at any time.

I do not claim any special form or composition of needle or scale or any specific method or process of combining the two; but I claim:

A knitting needle comprising a sleeve of translucent material and a separate member carrying a scale inserted in the sleeve.

LUCILLE DILLARD SCHOOLFIELD.